United States Patent
Xie

(10) Patent No.: US 9,617,163 B2
(45) Date of Patent: Apr. 11, 2017

(54) METHOD FOR MAKING EUO FRAMEWORK TYPE MOLECULAR SIEVES

(71) Applicant: Dan Xie, Richmond, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 406 days.

(21) Appl. No.: 14/512,008

(22) Filed: Oct. 10, 2014

(65) Prior Publication Data

US 2016/0101986 A1    Apr. 14, 2016

(51) Int. Cl.
*C01B 39/48* (2006.01)

(52) U.S. Cl.
CPC .................................. *C01B 39/48* (2013.01)

(58) Field of Classification Search
CPC .................................................. C01B 39/48
See application file for complete search history.

(56) References Cited

U.S. PATENT DOCUMENTS

| | | | |
|---|---|---|---|
| 4,537,754 A | 8/1985 | Casci et al. | |
| 4,640,829 A | 2/1987 | Rubin | |
| 4,695,667 A | 9/1987 | Sumitani et al. | |
| 6,337,063 B1 | 1/2002 | Rouleau et al. | |
| 6,342,200 B1 | 1/2002 | Rouleau et al. | |
| 6,350,429 B1 * | 2/2002 | Murrell | B01J 29/035 423/305 |
| 6,514,479 B1 | 2/2003 | Merlen et al. | |
| 6,616,910 B2 | 9/2003 | Rouleau et al. | |
| 7,431,913 B2 | 10/2008 | Caullet et al. | |
| 8,038,982 B2 | 10/2011 | Rouleau et al. | |
| 8,557,220 B2 | 10/2013 | Goergen et al. | |

FOREIGN PATENT DOCUMENTS

WO    2013189766    12/2013

OTHER PUBLICATIONS

G.W. Dodwell, R.P. Denkewicz and L.B. Sand "Crystallization of EU-1 and EU-2 in alkali and alkali-free systems" Zeolites, 1985, 5, 153-157.
A. Grunewald-Luke, B. Marler, M. Hochgrafe and H. Gies "Quinuclidine derivatives as structure directing agents for the synthesis of boron containing zeolites" J. Mater. Chem. 1999, 9, 2529-2536.
R. Millini, L.C. Carluccio, A. Carati and W.O. Parker Jr. "Synthesis and characterization of borosilicates with the EUO framework topology" Micropor. Mesopor. Mater., 2001, 46, 191-201.
M. Arranz, J. Perez-Pariente, P.A. Wright, A.M.Z. Slawin, T. Blasco, L. Gomez-Hortiguela and F. Cora "Cooperative structure-directing effect of fluorine-containing organic molecules and fluoride anions in the synthesis of zeolites" Chem. Mater. 2005, 17, 4374-4385.

* cited by examiner

*Primary Examiner* — David M Brunsman
(74) *Attorney, Agent, or Firm* — Terrence M. Flaherty

(57) ABSTRACT

A method for preparing EUO framework type molecular sieve is disclosed using an N,N'-dimethyl-1,4-diazabicyclo[2.2.2]octane dication as a structure directing agent. The EUO framework type molecular sieve, in its as-synthesized form, contains in its intracrystalline pores the N,N'-dimethyl-1,4-diazabicyclo[2.2.2]octane dication.

15 Claims, 2 Drawing Sheets

METHOD FOR MAKING EUO FRAMEWORK TYPE MOLECULAR SIEVES

TECHNICAL FIELD

This disclosure relates generally to EUO framework type molecular sieves and methods for preparing the same using an N,N'-dimethyl-1,4-diazabicyclo[2.2.2]octane dication as a structure directing agent.

BACKGROUND

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "*Atlas of Zeolite Framework Types*," Sixth Revised Edition, Elsevier, 2007.

One known molecular sieve for which a structure has been established is the material designated as EUO, which is a molecular sieve having a one-dimensional microporous framework, with channels having a diameter of 4.1×5.4 Å, with large lateral side pockets. According to N. A. Briscoe et al. (*Zeolites*, 1988, 8, 74-76), the lateral pockets have a depth of 8.1 Å and a diameter of 6.8×5.8 Å. Molecular sieves with the EUO framework type include EU-1, TPZ-3, and ZSM-50.

U.S. Pat. No. 4,537,754 discloses zeolite EU-1 and its synthesis using a dicationic alkylated polymethylene diamine as a structure directing agent.

U.S. Pat. No. 4,695,667 discloses zeolite TPZ-3 and its synthesis using an N,N,N,N',N',N'-hexamethyl-1,6-hexane diammonium cation as a structure directing agent.

U.S. Pat. No. 4,640,829 discloses zeolite ZSM-50 and its synthesis using a dibenzyldimethylammonium cation as a structure directing agent.

U.S. Pat. No. 7,431,913 discloses the synthesis of EUO framework type zeolites in the presence of an N,N-dimethyl-N,N-di(3,3-dimethylbutyl)ammonium cation as a structure directing agent.

U.S. Pat. No. 8,038,982 discloses the synthesis of EUO framework type zeolites using an alkyl quinuclidinium cation as a structure directing agent.

It has now been found that pure phase EUO framework type molecular sieves can be prepared using an N,N'-dimethyl-1,4-diazabicyclo[2.2.2]octane dication as a structure directing agent.

SUMMARY

In accordance with the present disclosure, there is provided a method of preparing EUO framework type molecular sieves by contacting under crystallization conditions (1) at least one source of at least one oxide of a tetravalent element; (2) one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; and (5) an N,N'-dimethyl-1,4-diazabicyclo[2.2.2]octane dication.

In another aspect, there is provided a process for preparing EUO framework type molecular sieves by: (a) preparing a reaction mixture containing (1) at least one source of at least one oxide of a tetravalent element; (2) one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) an N,N'-dimethyl-1,4-diazabicyclo[2.2.2]octane dication; and (6) water; and (b) subjecting the reaction mixture to crystallization conditions sufficient to form crystals of the EUO framework type molecular sieve.

In yet another aspect, there is provided an EUO framework type molecular sieve having a composition, as-synthesized and in its anhydrous state, in terms of mole ratios, as follows:

|  | Broad | Exemplary |
|---|---|---|
| $TO_2/X_2O_b$ | 10 to 100 | 30 to 80 |
| $Q/TO_2$ | 0.01 to 0.10 | 0.01 to 0.10 |
| $M/TO_2$ | 0.01 to 0.15 | 0.01 to 0.15 | wherein (1) T is selected from the group consisting of tetravalent elements from Groups 4-14 of the Periodic Table, and mixtures thereof; (2) X is selected from the group consisting of trivalent and pentavalent elements from Groups 3-13 of the Periodic Table, and mixtures thereof; (3) stoichiometric variable b equals the valence state of compositional variable X (e.g., when X is trivalent, b=3; when X is pentavalent, b=5); (4) Q is an N,N'-dimethyl-1,4-diazabicyclo[2.2.2]octane dication; and (5) M is selected from the group consisting of elements from Groups 1 and 2 of the Periodic Table.

DETAILED DESCRIPTION

Introduction

Figure 1:
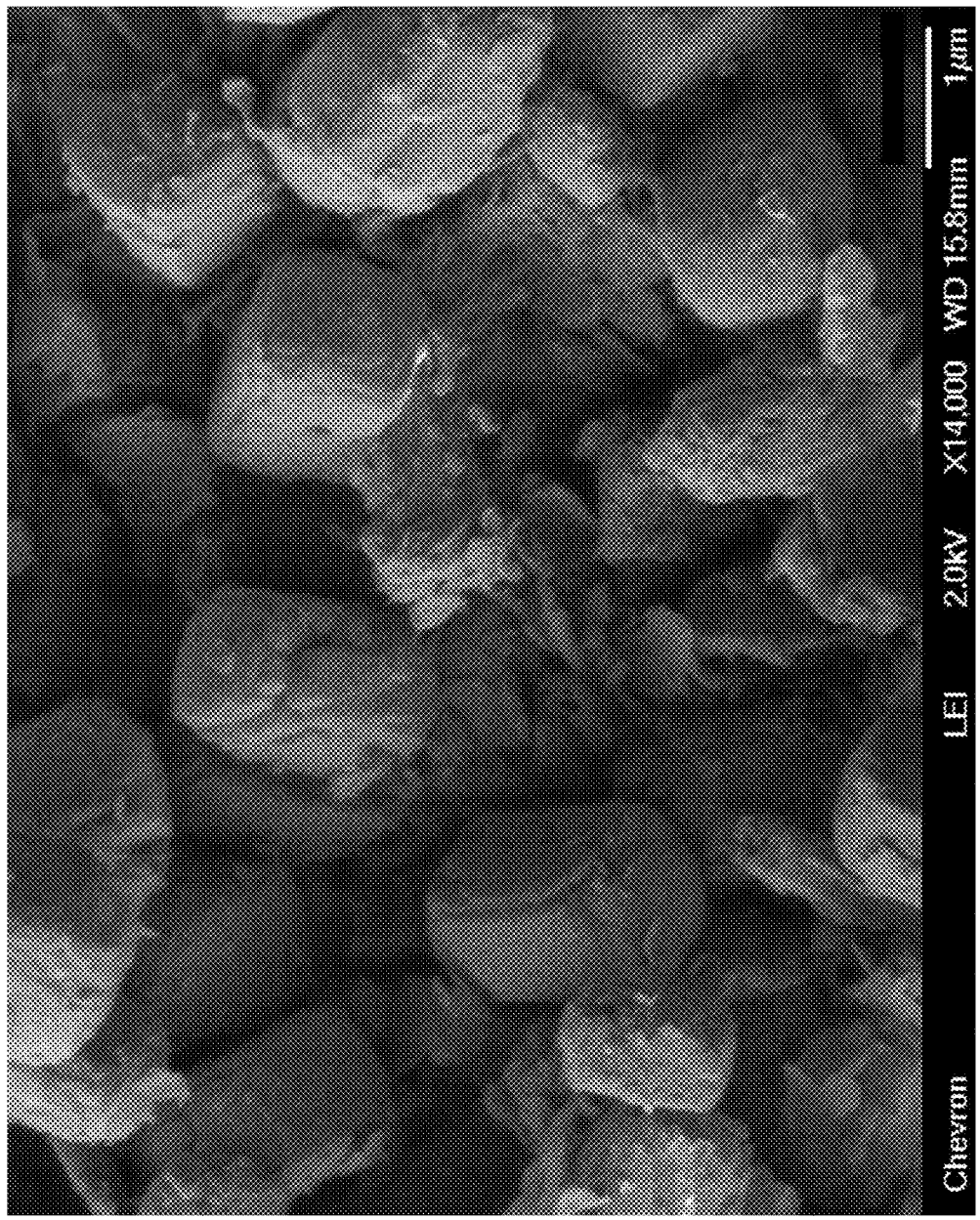
FIG. 1 is a Scanning Electron Micrograph (SEM) image of the as-synthesized zeolite prepared in Example 1.

The following terms will be used throughout the specification and will have the following meanings unless otherwise indicated.

The term "framework type" is used in the sense described in the "*Atlas of Zeolite Framework Types*," Sixth Revised Edition, Elsevier, 2007.

As used herein, the numbering scheme for the Periodic Table Groups is as disclosed in *Chem. Eng. News*, 63(5), 27 (1985).

In preparing EUO framework type molecular sieves, an N,N'-dimethyl-1,4-diazabicyclo[2.2.2]octane dication ("dimethyl DABCO dication") is used as the structure directing agent ("SDA"), also known as a crystallization template. The SDA is represented by the following structure (1):

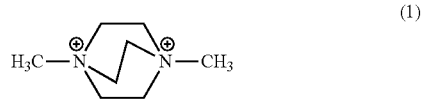

(1)

N,N'-dimethyl-1,4-diazabicyclo[2.2.2]octane dication

The SDA dication is associated with anions which can be any anion that is not detrimental to the formation of the molecular sieve. Representative anions include elements from Group 17 of the Periodic Table (e.g., fluoride, chloride, bromide, and iodide), hydroxide, sulfate, tetrafluoroborate, acetate, carboxylate, and the like.

Reaction Mixture

In general, the EUO framework type molecular sieve is prepared by: (a) preparing a reaction mixture containing (1) at least one source of an oxide of at least one tetravalent element; (2) one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) an N,N'-dimethyl-1,4-diazabicyclo[2.2.2]octane dication; and (6) water; and (b) subjecting the reaction mixture to crystallization conditions sufficient to form crystals of the EUO framework type molecular sieve.

The composition of the reaction mixture from which the EUO framework type molecular sieve is formed, in terms of mole ratios, is identified in Table 1 below:

TABLE 1

| Components | Broad | Exemplary |
|---|---|---|
| $TO_2/X_2O_b$ | 10 to 100 | 30 to 80 |
| $M/TO_2$ | 0.05 to 0.50 | 0.05 to 0.30 |
| $Q/TO_2$ | 0.05 to 0.50 | 0.10 to 0.30 |
| $OH/TO_2$ | 0.10 to 1.0 | 0.20 to 0.80 |
| $H_2O/TO_2$ | 5 to 100 | 10 to 50 | wherein compositional variables T, X, M and Q and stoichiometric variable b are as described herein above.

In one sub-embodiment, the composition of the reaction mixture from which the EUO framework type molecular sieve is formed, in terms of mole ratios, is identified in Table 2 below:

TABLE 2

| Components | Broad | Exemplary |
|---|---|---|
| $SiO_2/Al_2O_3$ | 10 to 100 | 30 to 80 |
| $M/SiO_2$ | 0.05 to 0.50 | 0.05 to 0.30 |
| $Q/SiO_2$ | 0.05 to 0.50 | 0.10 to 0.30 |
| $OH/SiO_2$ | 0.10 to 1.0 | 0.20 to 0.80 |
| $H_2O/SiO_2$ | 5 to 100 | 10 to 50 | wherein compositional variables M and Q are as described herein above.

As noted above, for each embodiment described herein, T is selected from the group consisting of tetravalent elements from Groups 4-14 of the Periodic Table. In one sub-embodiment, T is selected from the group consisting of silicon (Si), germanium (Ge), titanium (Ti), and mixtures thereof. In another sub-embodiment, T is selected from the group consisting of Si, Ge, and mixtures thereof. In one sub-embodiment, T is Si. Sources of elements selected for composition variable T include oxides, hydroxides, acetates, oxalates, ammonium salts and sulfates of the element(s) selected for T. In one sub-embodiment, each source(s) of the element(s) selected for compositional variable T is an oxide. Where T is Si, sources useful for Si include fumed silica, precipitated silicates, silica hydrogel, silicic acid, colloidal silica, tetra-alkyl orthosilicates (e.g., tetraethyl orthosilicate), and silica hydroxides. Sources useful herein for Ge include germanium oxide and germanium ethoxide.

For each embodiment described herein, X is selected from the group consisting of trivalent and pentavalent elements from Groups 3-13 of the Periodic Table. In one sub-embodiment, X is selected from the group consisting of boron (B), aluminum (Al), gallium (Ga), indium (In), iron (Fe), and mixtures thereof. In another sub-embodiment, X is selected from the group consisting of B, Al, Ga, In, and mixtures thereof. In one sub-embodiment X is Al. Sources of elements selected for compositional variable X include oxides, hydroxides, acetates, oxalates, ammonium salts and sulfates of the element(s) selected for X. Where X is Al, sources useful for Al include aluminates, alumina, and aluminum compounds such as $AlCl_3$, $Al_2(SO_4)_3$, $Al(OH)_3$, kaolin clays, and other zeolites. An example of the source of aluminum oxide is zeolite Y. Boron, gallium, indium, titanium, and iron can be added in forms corresponding to their aluminum and silicon counterparts.

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, acetates, oxalates and citrates thereof.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the EUO framework type molecular sieve is synthesized by: (a) preparing a reaction mixture as described herein above; and (b) subjecting the reaction mixture to crystallization conditions sufficient to form crystals of the molecular sieve.

The reaction mixture is maintained at an elevated temperature until the crystals of the molecular sieve are formed. The hydrothermal crystallization is usually conducted under pressure and usually in an autoclave so that the reaction mixture is subject to autogenous pressure, at a temperature of from 125° C. to 200° C.

During the hydrothermal crystallization step, the molecular sieve crystals can be allowed to nucleate spontaneously from the reaction mixture. The use of crystals as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount of from 1 to 10% of the weight of the source for compositional variable T used in the reaction mixture.

Once the molecular sieve crystals have formed, the solid product is separated from the reaction mixture by standard mechanical techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to the removal of the SDA. The SDA can be removed by thermal treatment (e.g., calcination), preferably in an oxidative atmosphere (e.g., air, gas with an oxygen partial pressure of greater than 0 kPa) at a temperature readily determinable by a skilled artisan sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can be subsequently calcined in steam, air or inert gas at temperatures ranging from 200° C. to 800° C. for periods of time ranging from 1 to 48 hours, or more. Usually, it is desirable to remove the extra-framework cation (e.g., Na$^+$) by ion exchange or other known technique and replace it with hydrogen, ammonium, or any desired metal ion.

Characterization of the Molecular Sieve

EUO framework type molecular sieves made by the process described herein have a composition, as-synthesized and in the anhydrous state, as described in Table 3 (in terms of mole ratios):

TABLE 3

|  | Broad | Exemplary |
|---|---|---|
| $TO_2/X_2O_b$ | 10 to 100 | 30 to 80 |
| $Q/TO_2$ | 0.01 to 0.10 | 0.01 to 0.10 |
| $M/TO_2$ | 0.01 to 0.15 | 0.01 to 0.15 | wherein compositional variables T, X, Q and M and stoichiometric variable b are as described herein above.

In one sub-embodiment, the EUO framework type molecular sieves made by the process described herein have a composition, as-synthesized and in the anhydrous state, as described in Table 4 (in terms of mole ratios:

TABLE 4

|  | Broad | Exemplary |
|---|---|---|
| $SiO_2/Al_2O_3$ | 10 to 100 | 30 to 80 |
| $Q/SiO_2$ | 0.01 to 0.10 | 0.01 to 0.10 |
| $M/SiO_2$ | 0.01 to 0.15 | 0.01 to 0.15 | wherein compositional variables Q and M are as described herein above.

The EUO framework type molecular sieves synthesized by the process described herein are characterized by their X-ray diffraction pattern. X-ray diffraction patterns representative of EUO framework type molecular sieves can be referenced in the "*Collection of Simulated XRD Powder Patterns for Zeolites*," Fifth Revised Edition, Elsevier, 2007. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern. Notwithstanding these minor pertubations, the basic crystal structure remains unchanged.

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks, and d, the interplanar spacing corresponding to the recorded lines, can be calculated.

EXAMPLES

The following illustrative examples are intended to be non-limiting.

Example 1

0.48 g of a 50% NaOH solution, 2.30 g of deionized water and 11.19 g of a 19% dimethyl DABCO solution were mixed together in a Teflon liner. Then, 2.50 g of CBV760® Y-zeolite powder (Zeolyst International, $SiO_2/Al_2O_3$ mole ratio=60) was added slowly to the solution. The resulting gel was stirred until homogeneous. The liner was then capped and placed within a Parr steel autoclave reactor. The autoclave was put in an oven heated at 150° C. for 12 days. The solid products were recovered from the cooled reactor by centrifugation, washed with deionized water and dried at 95° C.

Figure 2:
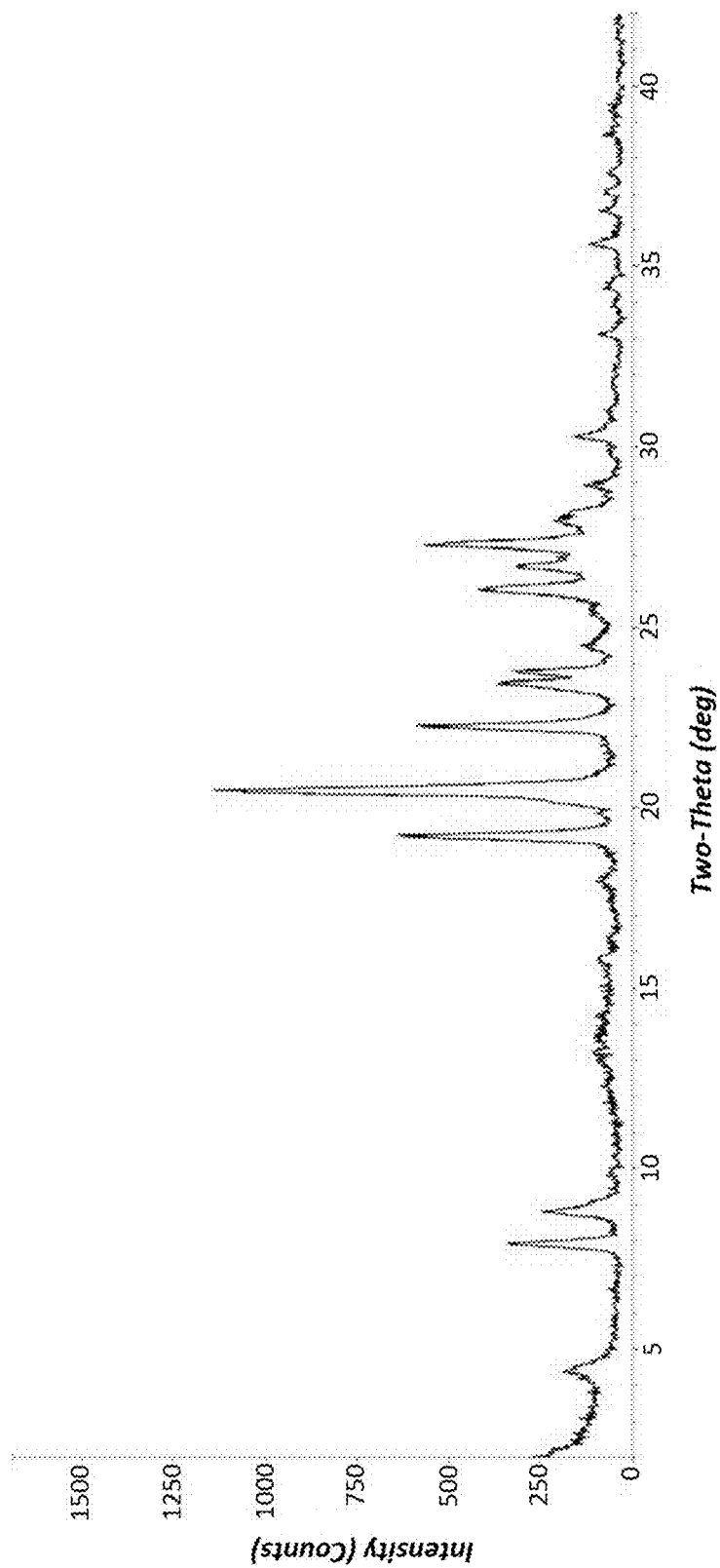
FIG. 2 is a powder X-ray diffraction (XRD) pattern of the as-synthesized zeolite prepared in Example 1.

The resulting zeolite product was analyzed by SEM and powder XRD. The SEM image shown in FIG. 1 indicates a uniform field of crystals and the powder XRD pattern shown in FIG. 2 indicates the material is pure EUO framework type zeolite.

The product had a $SiO_2/Al_2O_3$ mole ratio of 46.7, as determined by ICP elemental analysis.

Example 2

0.10 g of a 50% NaOH solution, 0.46 g of deionized water and 2.26 g of a 19% dimethyl DABCO solution were mixed together in a Teflon liner. Then, 0.50 g of CBV780® Y-zeolite powder (Zeolyst International, $SiO_2/Al_2O_3$ mole ratio=80) was added slowly to the solution. The resulting gel was stirred until homogeneous. The liner was then capped and placed within a Parr steel autoclave reactor. The autoclave was put in an oven heated at 150° C. for 8 days. The solid products were recovered from the cooled reactor by centrifugation, washed with deionized water and dried at 95° C.

The product of this preparation was identified by powder XRD analysis as an EUO framework type zeolite.

The product had a $SiO_2/Al_2O_3$ mole ratio of 60.3, as determined by ICP elemental analysis.

Example 3

0.25 g of a 50% NaOH solution, 2.48 g of deionized water, 3.61 g of a 19% dimethyl DABCO solution and 0.78 g of 40% LUDOX® AS-40 colloidal silica were mixed together in a Teflon liner. Then, 1.00 g of CBV720® Y-zeolite powder (Zeolyst International, $SiO_2/Al_2O_3$ mole ratio=30) was added slowly to the solution. The resulting gel was stirred until homogeneous. The liner was then capped and placed within a Parr steel autoclave reactor. The autoclave was put in an oven heated at 150° C. for 15 days. The solid products were recovered from the cooled reactor by centrifugation, washed with deionized water and dried at 95° C.

The product of this preparation was identified by powder XRD analysis as an EUO framework type zeolite.

The product had a SiO$_2$/Al$_2$O$_3$ mole ratio of 34.8, as determined by ICP elemental analysis.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing an EUO framework type molecular sieve, comprising:
   (a) preparing a reaction mixture containing:
      (1) at least one source of an oxide of at least one tetravalent element;
      (2) one or more sources of one or more oxides selected from the group consisting of oxides of trivalent elements, pentavalent elements, and mixtures thereof;
      (3) at least one source of an element selected from Groups 1 and 2 of the Periodic Table;
      (4) hydroxide ions;
      (5) an N,N'-dimethyl-1,4-diazabicyclo[2.2.2]octane dication; and
      (6) water; and
   (b) subjecting the reaction mixture to crystallization conditions sufficient to form crystals of the EUO framework type molecular sieve.

2. The method of claim 1, wherein the molecular sieve is prepared from a reaction mixture comprising, in terms of mole ratios, the following:

| | |
|---|---|
| TO$_2$/X$_2$O$_b$ | 10 to 100 |
| M/TO$_2$ | 0.05 to 0.50 |
| Q/TO$_2$ | 0.05 to 0.50 |
| OH/TO$_2$ | 0.10 to 1.0 |
| H$_2$O/TO$_2$ | 5 to 100 | wherein:
   (1) T is selected from the group consisting of tetravalent elements from Groups 4-14 of the Periodic Table, and mixtures thereof;
   (2) X is selected from the group consisting of trivalent and pentavalent elements from Groups 3-13 of the Periodic Table, and mixtures thereof;
   (3) b equals the valence state of X;
   (4) M is selected from the group consisting of elements from Groups 1 and 2 of the Periodic Table; and
   (5) Q is an N,N'-dimethyl-1,4-diazabicyclo[2.2.2]octane dication.

3. The method of claim 2, wherein T is selected from Si, Ge, and mixtures thereof.

4. The method of claim 2, wherein X is selected from B, Al, Ga, In, Fe, and mixtures thereof.

5. The method of claim 2, wherein T is Si and X is Al.

6. The method of claim 2, wherein the molecular sieve is prepared from a reaction comprising, in terms of mole ratios, the following:

| | |
|---|---|
| TO$_2$/X$_2$O$_b$ | 30 to 80 |
| M/TO$_2$ | 0.05 to 0.30 |
| Q/TO$_2$ | 0.10 to 0.30 |
| OH/TO$_2$ | 0.20 to 0.80 |
| H$_2$O/TO$_2$ | 10 to 50. |

7. The method of claim 1, wherein the molecular sieve has a composition, as-synthesized and in its anhydrous state, in terms of mole ratios, as follows:

| | |
|---|---|
| TO$_2$/X$_2$O$_b$ | 10 to 100 |
| Q/TO$_2$ | 0.01 to 0.10 |
| M/TO$_2$ | 0.01 to 0.15 | wherein:
   (1) T is selected from the group consisting of tetravalent elements from Groups 4-14 of the Periodic Table, and mixtures thereof;
   (2) X is selected from the group consisting of trivalent and pentavalent elements from Groups 3-13 of the Periodic Table, and mixtures thereof;
   (3) b equals the valence state of X;
   (4) Q is an N,N'-dimethyl-1,4-diazabicyclo[2.2.2]octane dication; and
   (5) M is selected from the group consisting of elements from Groups 1 and 2 of the Periodic Table.

8. The method of claim 7, wherein T is selected from Si, Ge, and mixtures thereof.

9. The method of claim 7, wherein X is selected from B, Al, Ga, In, Fe and mixtures thereof.

10. The method of claim 7, wherein T is Si and X is Al.

11. An EUO framework type molecular sieve having a composition, as-synthesized and in its anhydrous state, in terms of mole ratios, as follows:

| | |
|---|---|
| $TO_2/X_2O_b$ | 10 to 100 |
| $Q/TO_2$ | 0.01 to 0.10 |
| $M/TO_2$ | 0.01 to 0.15 | wherein:
(1) T is selected from the group consisting of tetravalent elements from Groups 4-14 of the Periodic Table, and mixtures thereof;
(2) X is selected from the group consisting of trivalent and pentavalent elements from Groups 3-13 of the Periodic Table, and mixtures thereof;
(3) b equals the valence state of X;
(4) Q is an N,N'-dimethyl-1,4-diazabicyclo[2.2.2]octane dication; and
(5) M is selected from the group consisting of elements from Groups 1 and 2 of the Periodic Table.

12. The molecular sieve of claim 11, wherein T is selected from Si, Ge, and mixtures thereof.

13. The molecular sieve of claim 11, wherein X is selected from B, Al, Ga, In, Fe and mixtures thereof.

14. The molecular sieve of claim 11, wherein T is Si and X is Al.

15. The molecular sieve of claim 11, wherein the molecular sieve has a composition, as-synthesized and in its anhydrous state, in terms of mole ratios, as follows:

| | |
|---|---|
| $TO_2/X_2O_b$ | 30 to 80 |
| $Q/TO_2$ | 0.01 to 0.10 |
| $M/TO_2$ | 0.01 to 0.15. |

\* \* \* \* \*